United States Patent
Kanaya et al.

(10) Patent No.: US 8,641,904 B2
(45) Date of Patent: Feb. 4, 2014

(54) METHOD FOR MEMBRANE BACKWASHING AND BACKWASHING APPARATUS

(75) Inventors: Shinjiro Kanaya, Handa (JP); Nobuhiro Aoki, Nagoya (JP)

(73) Assignee: Metawater Co., Ltd., Chiyoda-Ku (JP)

( * ) Notice: Subject to any disclaimer, the term of this patent is extended or adjusted under 35 U.S.C. 154(b) by 907 days.

(21) Appl. No.: 11/568,238

(22) PCT Filed: May 13, 2005

(86) PCT No.: PCT/JP2005/008765
§ 371 (c)(1),
(2), (4) Date: May 15, 2007

(87) PCT Pub. No.: WO2005/110584
PCT Pub. Date: Nov. 24, 2005

(65) Prior Publication Data
US 2007/0210001 A1 Sep. 13, 2007

(30) Foreign Application Priority Data
May 13, 2004 (JP) ................................. 2004-143899

(51) Int. Cl.
*B01D 65/02* (2006.01)
*C02F 1/44* (2006.01)

(52) U.S. Cl.
USPC ....................... 210/636; 210/321.69; 210/791

(58) Field of Classification Search
USPC .............................. 210/636, 321.69, 791, 618
See application file for complete search history.

(56) References Cited

U.S. PATENT DOCUMENTS

| | | | | | |
|---|---|---|---|---|---|
| 4,629,483 | A | * | 12/1986 | Stanton | ........................... 55/487 |
| 4,874,516 | A | * | 10/1989 | Kondo | .......................... 210/490 |
| 4,935,143 | A | | 6/1990 | Kopp et al. | |
| 5,164,085 | A | * | 11/1992 | Spokoiny et al. | ............. 210/256 |
| 5,244,585 | A | * | 9/1993 | Sugimoto | ...................... 210/798 |
| 5,584,992 | A | * | 12/1996 | Sugimoto | ................. 210/167.11 |
| 5,643,455 | A | * | 7/1997 | Kopp et al. | .................... 210/636 |
| 5,647,988 | A | * | 7/1997 | Kawanishi et al. | ............ 210/636 |
| 2002/0011438 | A1 | | 1/2002 | Jimbo et al. | |
| 2003/0132174 | A1 | * | 7/2003 | Isomura et al. | ............... 210/767 |
| 2004/0200785 | A1 | * | 10/2004 | Oyachi et al. | .................. 210/767 |

FOREIGN PATENT DOCUMENTS

| | | |
|---|---|---|
| JP | 51-103661 A1 | 9/1976 |
| JP | 01-500732 | 3/1989 |

(Continued)

*Primary Examiner* — Dirk Bass
(74) *Attorney, Agent, or Firm* — Burr & Brown, PLLC

(57) ABSTRACT

A backwashing method incorporating a membrane filtration apparatus in which a ceramic filtration membrane including a substrate layer 11*b* having an extremely large number of filtration pores and a separating layer 11*a* having filtration pores smaller than those of the substrate layer is accommodated in a casing. Air controlled to a pressure p1 is supplied to the secondary side of the filtration membrane so as to drain the filtrated water in the membrane filtration apparatus gradually toward the primary side. After that, air pressure is increased to p3 so as to push the water in the filtration membrane toward the primary side together with the air, thereby peeling off any fouling substances. Unlike in conventional cases, a large amount of backwashing drain water is at no time drained at any one time, and thus, without reducing the effectiveness of backwashing, a backwashing drain pipe can be designed to have a small diameter. As a result, equipment can be reduced in size and the flexibility of equipment can be enhanced.

3 Claims, 5 Drawing Sheets

(56) References Cited

FOREIGN PATENT DOCUMENTS

| | | |
|---|---|---|
| JP | 07-051548 A1 | 2/1995 |
| JP | 07-068139 A1 | 3/1995 |
| JP | 11-128700 A1 | 5/1999 |
| JP | 2000-033238 A1 | 2/2000 |
| JP | 2002-035748 A1 | 2/2002 |
| JP | 2002-126468 A1 | 5/2002 |
| JP | 2002-282629 | 10/2002 |
| WO | 88/00494 | 1/1988 |
| WO | 93/02779 A1 | 2/1993 |

* cited by examiner (A)

(B)

(C)

(D)

Prior Art

Prior Art

METHOD FOR MEMBRANE BACKWASHING AND BACKWASHING APPARATUS

TECHNICAL FIELD

The present invention relates to a method for membrane backwashing, and a backwashing apparatus.

BACKGROUND ART

A membrane filtration apparatus, such as is exemplified in FIG. 2, has a structure in which a membrane element 1, formed with a large number of filtration channels 12 arranged in a porous portion 11 so as to be parallel to one another, is accommodated in a casing 13, as shown in FIG. 4. The membrane filtration apparatus performs a filtration operation as follows. In a cross flow filtration method, raw water a is introduced into a primary inlet chamber 13a. The raw water a is then passed through the filtration channels 12, during which time it is filtrated by minute filtration pores within the porous portion 11 and the raw water then circulates via a primary outlet chamber 13b and an upper header pipe in the form of returned raw water b. The water that has been filtrated is then taken out from a header tube 14. In a dead end filtration method, the primary side of the apparatus is filled with water, and then, the valve located at the upper portion of the casing is closed. The raw water that has been introduced is processed and the entire amount thereof is obtained as filtrated water via a filtrated water header pipe 14. The water c that has been filtrated is taken out from the secondary chamber 13c located between the side surface of the casing 13 and the side surface of the filtration element 1.

As the filtration operation proceeds, suspended solid (SS) that has been separated accumulates on an inner surface of the filtration channels 12 so as to develop into fouling substances which result in a diminution in filtration efficiency. In such circumstances, the filtration operation is stopped at an appropriate timing and a backwashing operation is performed whereby backwashing water f is supplied from the secondary chamber 13c at a high pressure so as to flow back through the filtration pores of the porous portion 11, and peel off fouling substances that have accumulated on the inner surface of the filtration channels 12. After the backwashing water f has peeled off the fouling substances, it is removed in the form of a backwashing waste water e.

In such a circumstances, the filtrated water c itself is normally utilized as a backwashing water f. However, as the backwashing operation is repeated, the volume of backwashing waste water e increases, whereas the volume of water c filtrated decreases relatively. As a result, a problem arises insofar that the operational efficiency of the filtration apparatus diminishes. In an attempt to solve this problem, a method has been suggested in which, instead of utilizing filtrated water c as a backwashing water f (Patent Exhibits 1 and 2), high-pressurized air is supplied for performing a backwashing operation.

However, in both of these cases, one where the filtrated water is used, and the other where high-pressurized air is used to effect the backwashing operation, a large amount of water that has been lodged in the membrane element 1 is suddenly pushed toward the primary side at one and the same time. In order to enhance the backwashing effect, it becomes necessary to expel the backwashing wastewater from the system quickly. To this end, it is important to design the diameter of the feed pipe so as to be of a sufficiently large size to facilitate the flow of the backwashing wastewater. However, this in itself is an impediment to membrane filtration equipment compact and also making the detracts from the degree of flexibility that is desirable in the arrangement of the equipment. In actual equipment in which a plurality of elements is used as a single operational unit, as is shown in FIG. 5 for example, the feed pipe for enhancing the backwashing waste water to flow is used as a lower header pipe 15, and is directly connected to the lower portion of the casing accommodating the membrane element 1. In this structure, in order to enable the backwashing wastewater flowing from the plurality of elements to move quickly, both the lower header pipe 15 and the backwashing waste water valve 16 have been required to have large diameters.

Patent Exhibit 1: Japanese Laid-Open Patent Publication No. 2002-126468: Claim 1, Paragraph (0010) Patent Exhibit 2: Japanese Laid-Open Patent Publication No. 2002-35748: Claim 2, Paragraph (0007)

DISCLOSURE OF THE INVENTION

Problems to be Solved by the Invention

The present invention has been made to solve the problems inherent in the prior arts described above, and an objective thereof is to provide a backwashing method and a backwashing apparatus that, without diminishing the effectiveness of backwashing, facilitate the design of a backwashing waste water pipe with a small diameter, thereby making it possible to use compact-sized equipment and at the same time enhance flexibility in the arrangement of the equipment arrangement.

Means for Solving the Problems

The method for membrane backwashing of the present invention which has been made to solve the problems described above, includes steps of: supplying air of a controlled pressure to a secondary side of the filtration membrane that is clogged with fouling substances so as to drain gradually toward a primary side of the filtrate that has been filtrated and that has remained within a membrane filtration apparatus; and increasing air pressure so as to push out water remaining in the filtration membrane toward the primary side and thereby peel off the fouling substances.

The membrane filtration apparatus should preferably include a ceramic filtration membrane including a substrate layer having an extremely large number of filtration pores and a separating layer having filtration pores that are smaller than those of the substrate layer, and a casing accommodating therein the ceramic filtration membrane. It is also possible to incorporate steps of draining gradually the filtrated water remaining in the membrane filtration apparatus, and then, pushing out toward the primary side the water remaining between the surface of the substrate layer and the boundary surface extending between the substrate layer and the separating layer. Further, prior to the backwashing operation, the water remaining in the filtration element may be substituted by washing water containing a washing chemical.

Further, the backwashing apparatus for use in a membrane filtration apparatus of the present invention which has been made to solve the problems described above, includes a filtration element made of a ceramic filtration membrane having an extremely large number of filtration pores and a casing accommodating the filtration element, wherein a filtration water header pipe is disposed below a filtration water feed pipe that also serves as a backwashing air feed pipe, and wherein a backwashing air feed source capable of controlling pressure is provided at the end of the backwashing air feed pipe.

Effects of the Invention

According to the present invention, air is supplied from the secondary side of the filtration membrane clogged with fouling substances while air pressure is controlled so as to replace the water remaining in the filtration membrane with air. Then, the filtrated water remaining in the membrane filtration apparatus is gradually drained toward the primary side. In this structure, the backwashing water can be drained without a need for enlarging the diameter of the feed pipe through which the backwashing wastewater flows. After that, air pressure is increased so as to push out, together with air, toward the primary side the water that has remained within the filtration membrane and thereby peel off the fouling substances. Since the volume of backwashing wastewater used at this time is relatively small, the wastewater can be drained without a need for enlarging the diameter of the feed pipe through which the backwashing wastewater flows. In consequence, without reducing the effectiveness of backwashing effect, equipment such as the lower header pipe can be designed with a small diameter, thereby making compact-sized equipment feasible and enhanced flexibility in arrangement of the equipment.

Further, the backwashing apparatus of the present invention includes a filtration water header pipe that is positioned below the filtration water feed pipe and also serves as a backwashing air feed pipe. In consequence, not only can the backwashing operation of the present invention described above be performed, but in addition, the filtrated water remaining within the filtrated water header pipe does not flow back when backwashing air is supplied. As a result, advantages ensue, insofar that the volume of backwashing waste water decreases, and there is also an improvement in the water recovery expressed by the ratio of the volume of waste water at the time of the backwashing operation relative to the volume of water filtrated.

DESCRIPTION OF REFERENCE NUMERALS

Figure 1:
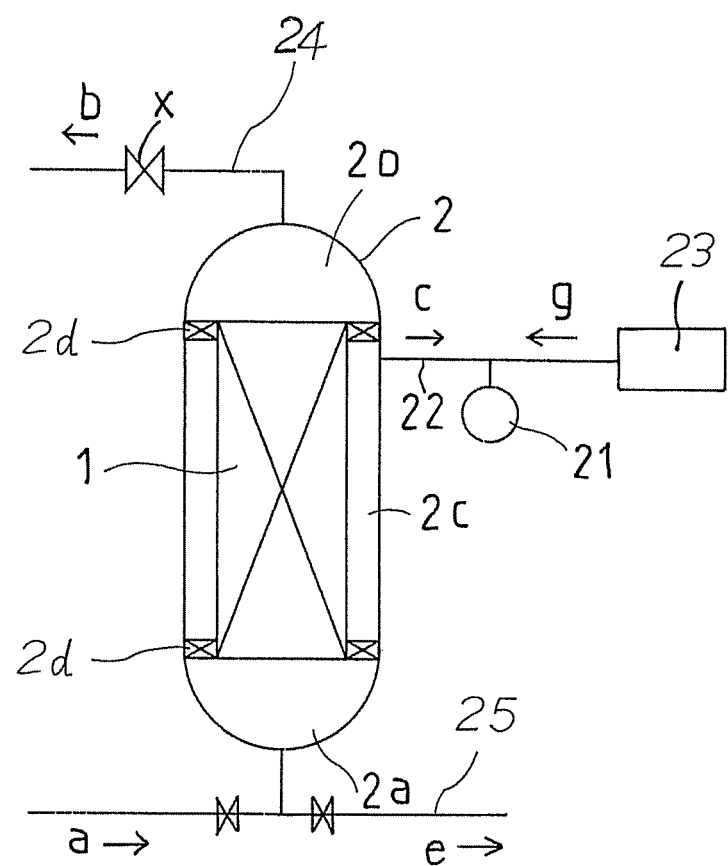
FIG. 1 is a schematic diagram of a membrane filtration apparatus.

1. Membrane element
2. Porous portion
11a. Separating layer
11b. Substrate layer
11x. Ceramic minute grains
11y. Ceramic coarse grains
12. Filtration channel
13. Casing
13a. Primary inlet chamber
13b. Primary outlet chamber
13c. Secondary chamber
14. Filtrated water header pipe
15. Lower header pipe
16. Backwashing drain valve
17. Upper header pipe
2. Casing
2a. Primary inlet chamber
2b. Primary outlet chamber
2c. Secondary chamber
2d. Packing
21. Filtrated water header pipe
22. Filtrated water feed pipe, serving also as a backwashing air feed pipe
23. Backwashing air feed source
24. Upper header pipe
25. Lower header pipe
a. Raw water
b. Returned raw water
c. Filtrated water
d. Backwashing drain water
e. Backwashing water
g. Air
x. Valve

BEST CONDITION FOR CARRYING OUT THE INVENTION

Next, embodiments of the present invention will be described with reference to FIGS. 1 to 3. A membrane filtration apparatus to which the present invention is applicable is basically the same as that described previously. In other words, as is shown in FIG. 2, the membrane filtration apparatus has a structure in which a membrane element 1 including a large number of filtration channels 12 arranged in parallel with one another within a porous portion 11 is accommodated in a casing 2. The upper and lower outer peripheries of the membrane element 1 are sealed by a packing 2d, and the upper and lower opposite end surfaces of the membrane element 1 itself are also sealed. Due to the nature of these structures, the raw water and the filtrated water never mix with each other. The raw water a is filtrated by means of a cross-flow method whereby the raw water a is introduced into a primary inlet chamber 2a and is circulated via a filtration channel 12, a primary outlet chamber 2b, and an upper header tube 24 in the form of a returned raw water b; or by means of a total-amount filtration method whereby the valve x disposed at a midway position within the primary outlet chamber 2b is closed. The raw water a is filtrated by means of a separating layer formed on an inner surface of the filtration channel 12 and having minute filtration pores. The filtrated water c is taken out from the filtrated water feed pipe 22 to a filtrated water header tube 21 via a secondary chamber 2c located between a side surface of the casing 2 and a side surface of the filtration element 1.

The present invention is characterized insofar that, when the filtration membrane is clogged with fouling substances as the filtration operation proceeds within the membrane filtration apparatus, a backwashing operation is performed according to following steps: 1) feeding air in the course of controlling pressure from the secondary side of the filtration membrane; 2) draining by pressurized air the filtrated water that has remained in the membrane filtration apparatus; and 3) increasing air pressure so as to push toward the primary side, together with air, the water that has been remained in the filtration membrane, and thereby peel off the fouling substances. Prior to the backwashing operation it is also possible to replace the water remaining in the filtration element by washing water containing washing chemicals.

The above point will now be explained in more detail. First of all, the filtration element 1 has a filtration membrane structure including, as shown in FIG. 3 (A), an extremely large number of ceramic coarse grains 11y, a substrate layer 11b having an extremely large number of filtration pores, ceramic minute grains 11x disposed at the primary side of the basic body layer 11b (i.e. at the side of the filtration channel 12), and a separating layer 11a having filtration pores each of which is of a size that is smaller than those of the substrate layer 11b.

(Step 1)

Figure 3:
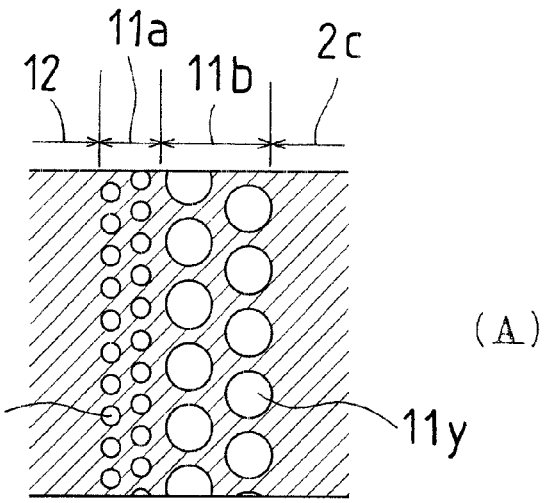
FIG. 3 is a schematic cross-sectional view of a filtration membrane for illustrating the backwashing method of the present invention.
Figure 3:
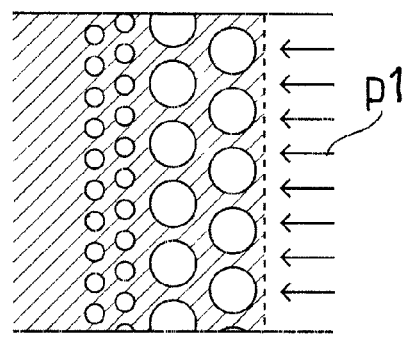
Figure 3:
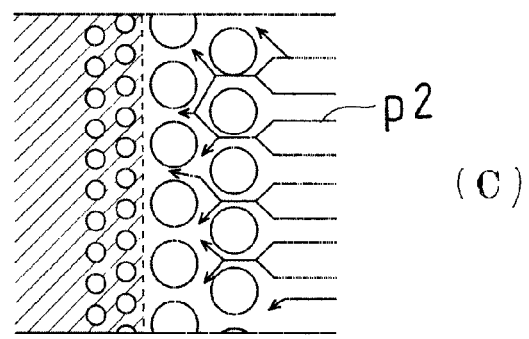
Figure 3:
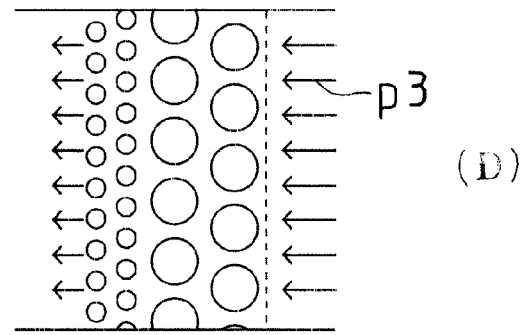

In the present invention, as a step 1, and as is shown in FIG. 3 (A), at the time of backwashing the membrane filtration apparatus including filtration element 1 that is thus structured and that is accommodated in the casing 2, in a state where the separating layer 11a, the substrate layer 11b, and the secondary chamber 2c are filled with the filtrated water, pressure-controlled air g is supplied, through the filtrated water feed pipe 22 serving as both a drain and air-feed pipe and a backwashing air feed pipe, to the secondary chamber 2c located between the filtration element 1 and the casing 2.

In step 1, air g, having a pressure p1 that is lower than the bubble point pressure of the substrate layer 11b, is sent into the secondary side chamber 2c. As a result of this, as is shown in FIG. 3 (B), the water in the secondary chamber 2c is substituted by air, and the water that has been filtrated is pushed and drained toward the primary side (i.e. toward the raw water side). By means of controlling the pressure p1, the filtrated water remaining in the membrane filtration apparatus can be gradually drained toward the primary side.

(Step 2)

The present invention may further include the following step. In other words, in step 2, subsequent to pushing out, by air having a pressure p1, the filtrated water from the secondary chamber, air g controlled at a higher pressure p2 can be supplied. As a result, as is shown in FIG. 3 (C), the water remaining in the substrate layer 11b (i.e. within a space extending from the surface of the substrate layer 11b to the boundary surface between the substrate layer 11b and the separating layer 11a) is substituted by air, and can gradually be drained toward the primary side.

The pressure p2 is in this case controlled so as to be higher than the pressure p1 employed in step 1. In other words, pressure p2 is set to a value that is higher than the bubble point pressure of the substrate layer 11b but lower than the bubble point pressure of the separating layer 11a. Alternatively, in step 1 it is also possible to supply air having identical pressure as p2 in step 2 so as to replace simultaneously the waters in the secondary chamber 2c and the substrate layer 11b. Accordingly, step 2 maybe performed after step 1, or steps 1 and 2 may in practice be performed simultaneously. Air with pressure p2 cannot pass through the separating layer.

(Step 3)

After substitution, by pressurized air during the two steps described above, of the waters in the secondary chamber 2c and in the substrate layer 11b, in a step 3, as is shown in FIG. 3(D), air g is supplied at a pressure p3 that is higher than the bubble point pressure of the separating layer 11a. As a result, the pressurized air pushes into the filtration channel 12 the water that was remaining in the separating layer 11a and peels off in the form of gushing air the substances that has accumulated. In this manner, fouling of the filtration membrane is eliminated. The water remaining in the filtration membrane which in step 3 is to be pushed into the filtration channel 12 occupies only about 2.5% of the casing volume (see the later description). Thus, draining at a high rate of flow is possible and satisfactory washing effects can be obtained without resorting to enlarging the diameter of a lower header pipe 25 through which the backwashing drain water flows.

Depending on the kind of substance fouling the membrane, it may be necessary to push out the fouling substance by the force of the backwashing water. In such a case, by directly proceeding from step 1 to step 3, water amounting to about 24% of the volume of the casing 2 (i.e. the volume of water remaining within the substrate layer 11b and the separating layer 11a) is pushed out of the separating layer at a high rate, thereby effectively washing the membrane.

Next, a backwashing apparatus of the present invention will be described.

Figure 4:
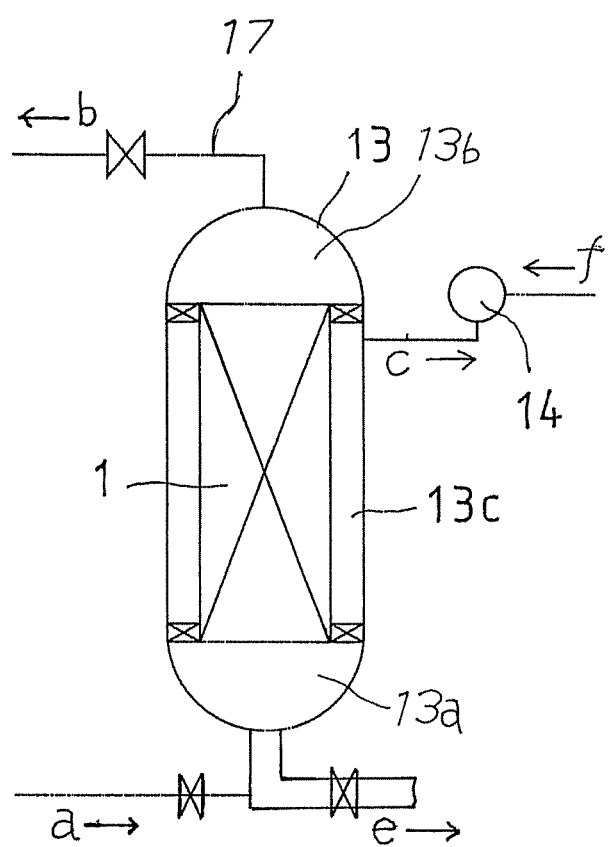
FIG. 4 is a schematic diagram of a conventional filtration apparatus.
Figure 5:
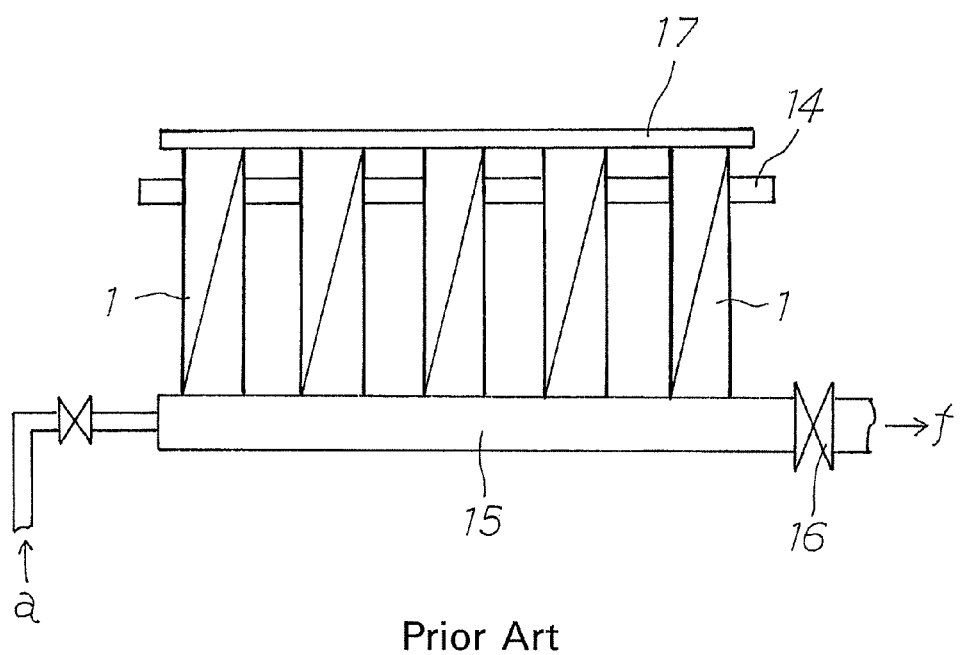
FIG. 5 is a schematic diagram illustrating actual conventional equipment installed with a large number of elements.

As is shown in FIG. 4, and for reasons explained below, a filtrated water header pipe 14 has conventionally been disposed above the filtrated water pipe 15 which serves also as a backwashing air feed pipe. Specifically, since water pressure is used in the backwashing operation, if air remains in the piping, the air remaining is compressed, thus resulting in a loss of backwashing air. In such circumstances, backwashing efficiency is seriously diminished. To prevent this, it is necessary to expel the air completely from the filtrated water feed pipe 15 by disposing the filtrated water header pipe 14 above the filtrated water feed pipe 15.

Figure 2:
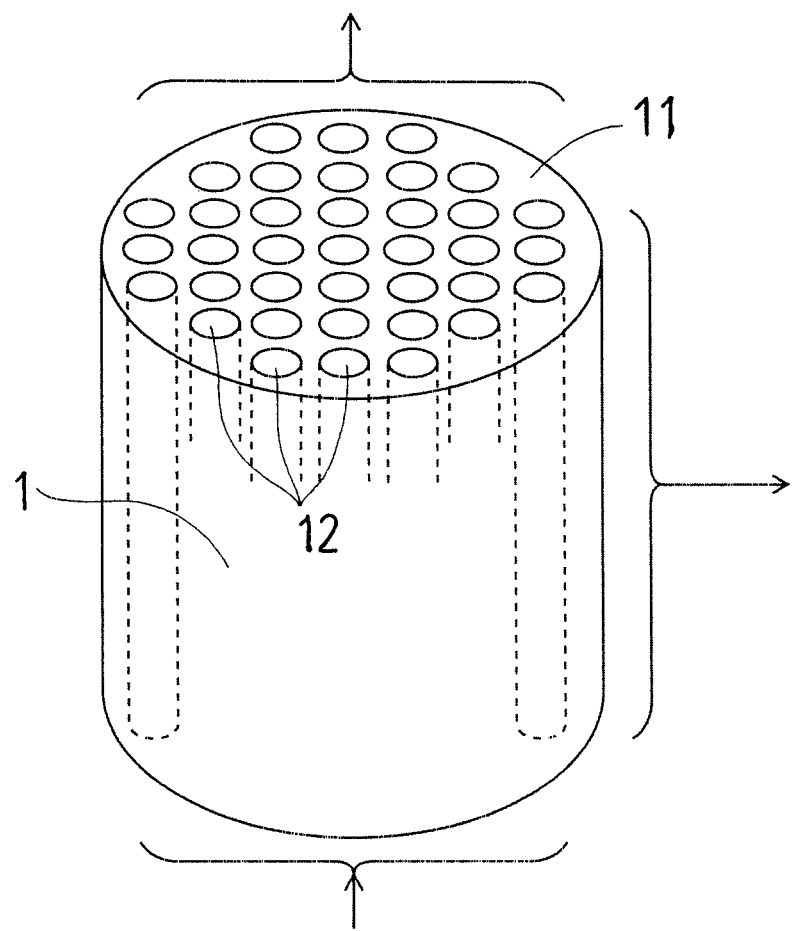
FIG. 2 is a perspective diagram illustrating a membrane element.

In contrast to the above, in the backwashing apparatus of the present invention, as is shown in FIG. 1, the filtrated water header pipe 21 is disposed below the filtrated water feed pipe 22, which also serves as a backwashing air feed pipe. In a conventional structure, the filtrated water remaining in the filtrated water header pipe 14 flows in a reverse direction at the time of the backwashing operation. In contrast, the present invention includes the step of replacing the water in the filtrated water feed pipe by air prior to the backwashing operation. Therefore, the existence of the remaining air exerts no influence on the effectiveness of backwashing. For this reason, it becomes possible to dispose the filtrated water header pipe 21 facing downward. As a result, even if air g is supplied from the backwashing air feed source 23, the filtrated water in the filtrated water header pipe 21 never flows backwards, and thus, the volume of backwashing drain water is reduced.

EXAMPLE

Hereinafter, an embodiment of the present invention will be described.

In a case where a membrane element 1 having a diameter of 180 mm and a length of 1000 mm, and containing therein 2000 channels of filtration channels (cells) each having an inner diameter of 2.5 mm, is accommodated in a casing 2 having a diameter of 200 mm, if one defines the volume of the casing (excluding the inlet chamber and the outlet chamber) as 100%, the volume of a secondary chamber 2c is 21%, the volume of a filtration element 1 is 48%, and the volume of a filtration channel is 31%. Further, in the membrane element 1, when the water ratio for a substrate layer and a separating layer is set at 9:1, and the porous rate of the substrate layer and the separating layer is set at 50%, the amounts of filtrated water remaining in the substrate layer and the separating layer are respectively 21% and 2.5%.

In a conventional backwashing method, the water in the secondary chamber of the casing amounting to 21%, the water in the substrate layer amounting to 21%, and the water in the separating layer amounting to 2.5%, i.e. 44.5% in total, are at least drained as backwashing drain water, and in the case of backwashing the membrane described above, water amounting to 40 liters is made to flow at a maximum flux rate 2 meters per second. In contrast, in the present invention according to the method described above, it is sufficient to make water amounting to only one liter to flow. Even by means of the method of directly proceeding from step 1 to step 3 described above, it is sufficient to make water amounting to only 6 liters flow. In a conventional case, the feed pipe has been required to have a diameter of 80 millimeters so as to facilitate the water amounting to 40 liters at the same flow rate as described above. In contrast, in the present invention, a feed pipe diameter of 25 millimeters is sufficient for one liter of water, and 50 millimeters is sufficient even for six liters of water. Which diameter to employ depends on the quality of the water, or on operational conditions, but in either case, in comparison with conventional apparatuses the apparatus can be significantly reduced in size.

The membrane used in this example includes a substrate layer having hole diameters of about 10 μm and a separating layer having hole diameters of 1 μm. When p1 is set to 10 kPa, p2 to 50 kPa, and p3 to 300 kPa, a backwashing operation conducted according to the three steps described above can be executed successfully.

The invention claimed is:

1. A method for backwashing a filtration membrane comprising the steps of:

housing a filtration element within a casing, said filtrate element being formed of a ceramic filtration membrane comprising a substrate layer defining a secondary side of the ceramic filtration membrane and a separation layer formed on said substrate layer and defining a primary side of the ceramic filtration membrane;

supplying raw water to the primary side of the ceramic filtration membrane and filtering the raw water to form filtrate water, which is removed from the casing via a filtrate water feed pipe and a filtrate water header pipe, wherein the filtrate water header pipe is arranged on a lower side of the filtrate water feed pipe; and supplying backwashing air to the ceramic filtration membrane via the filtrate water feed pipe when the ceramic filtration membrane is clogged with an obstructing material formed from filtering the raw water, wherein the backwashing air is supplied in the following stages:

supplying backwashing air controlled to a pressure not exceeding a bubble point of the substrate layer from the filtrate water feed pipe to the secondary side of the ceramic filtration membrane to gradually push out filtrate water that is built-up within the ceramic filtration membrane to the primary side of the ceramic filtration membrane, and discharging the built-up filtrate water from a lower header pipe connected to the casing;

increasing a pressure of the backwashing air to a controlled pressure exceeding the bubble pressure of the substrate layer but not exceeding a bubble pressure of the separation layer from the filtrate water feed pipe to the secondary side of the ceramic filtration membrane to gradually push out filtrate water that is built-up in the separation layer to the primary side of the ceramic filtration membrane, and discharging the built-up filtrate water from the lower header pipe connected to the casing; and increasing a pressure of the backwashing air to a controlled pressure exceeding the bubble pressure of the separation layer from the filtrate water feed pipe to the secondary side of the ceramic filtration membrane to peel off the obstructing material from the primary side of the ceramic filtration membrane with the backwashing air.

2. The method for membrane backwashing according to claim 1, wherein the substrate layer of the ceramic filtration membrane has a large number of filtration pores and the separating layer has filtration pores that are smaller in size than those of the substrate layer.

3. The method for membrane backwashing according to claim 1, wherein, prior to the backwashing operation, the water remaining in the filtration element is substituted by a washing water containing a washing chemical.

* * * * *